United States Patent
Berger

(10) Patent No.: US 10,035,318 B2
(45) Date of Patent: Jul. 31, 2018

(54) CLOSURE BAG WITH REINFORCED HANDLES

(71) Applicant: Parkdale Incorporated, Gastonia, NC (US)

(72) Inventor: Elliot Lewis Berger, Albuquerque, NM (US)

(73) Assignee: Parkdale Incorporated, Gastonia, NC (US)

( * ) Notice: Subject to any disclaimer, the term of this patent is extended or adjusted under 35 U.S.C. 154(b) by 0 days.

(21) Appl. No.: 14/639,483

(22) Filed: Mar. 5, 2015

(65) Prior Publication Data
US 2015/0251815 A1 Sep. 10, 2015

Related U.S. Application Data

(60) Provisional application No. 61/948,472, filed on Mar. 5, 2014.

(51) Int. Cl.
*B65D 33/14* (2006.01)
*B65D 33/25* (2006.01)
(Continued)

(52) U.S. Cl.
CPC .............. *B31B 19/90* (2013.01); *B31B 70/00* (2017.08); *B31B 70/81* (2017.08); *B65D 33/02* (2013.01); *B65D 33/08* (2013.01); *B65D 33/2508* (2013.01); *B29L 2031/7128* (2013.01); *B31B 70/008* (2017.08); *B31B 70/142* (2017.08); *B31B 70/64* (2017.08);
(Continued)

(58) Field of Classification Search
CPC .. B65D 33/14; B65D 33/2508; B65D 33/065; B65D 33/08; B65D 33/2591; B65D 75/566; B29L 2031/7128

USPC .......... 383/20, 10, 63, 103, 17, 6, 61.2, 61.3
See application file for complete search history.

(56) References Cited

U.S. PATENT DOCUMENTS 1,415,450 A * 5/1922 Johnson ................. B65D 33/08
383/10
5,033,868 A 7/1991 Peppiatt
(Continued)

FOREIGN PATENT DOCUMENTS

| EP | 1845025 A1 | 10/2007 |
|---|---|---|
| GB | 2250011 A | 5/1992 |
| WO | 2008/008450 A2 | 1/2008 |

OTHER PUBLICATIONS

Uline 13×18" Clean 3 Mil Zip Handle Bags Model No. S-10713C; accessed Jan. 22, 2015 at: http://www.uline.com/...la&id=S-10713C &gclid=CjwKEAiA3lKmBRDFx-P_rLyt6QUSJACqiAN8jjBl_ osWzeHQ_PzbQLbh7fpCUfbYFffltli2sb8cCKBoCox_w_wcB &gclsrc=aw.ds[Jan. 22, 2015 3:22:01 PM].
(Continued)

*Primary Examiner* — Christopher Demeree
(74) *Attorney, Agent, or Firm* — Parsons Summa

(57) ABSTRACT

A polymer bag is disclosed, along with a method of manufacture. The bag is formed of two facing sheets of polymer film, a top edge, a bottom edge, and two side edges. A polymeric zipper is attached to the inside of the facing sheets parallel to and between the top and bottom edges. A respective reinforcing patch is positioned on the inside surface of each of the two respective facing sheets and between the zipper and the top edge. An opening through each reinforcing patch and in the face overlying each patch defines a bag handle.

10 Claims, 9 Drawing Sheets

(51) Int. Cl.
*B29C 53/04* (2006.01)
*B31B 19/90* (2006.01)
*B65D 33/08* (2006.01)
*B65D 33/02* (2006.01)
*B31B 70/00* (2017.01)
*B31B 70/81* (2017.01)
*B29L 31/00* (2006.01)
*B31B 160/10* (2017.01)
*B31B 70/64* (2017.01)
*B31B 155/00* (2017.01)
*B31B 70/14* (2017.01)
*B31B 70/86* (2017.01)

(52) U.S. Cl.
CPC ......... *B31B 70/8131* (2017.08); *B31B 70/874* (2017.08); *B31B 2155/00* (2017.08); *B31B 2160/10* (2017.08)

(56) References Cited

U.S. PATENT DOCUMENTS

| | | | |
|---|---|---|---|
| 6,053,635 A * | 4/2000 | Anderson | B31B 19/86 383/10 |
| 6,361,209 B1 | 3/2002 | LaRue et al. | |
| 6,481,183 B1 | 11/2002 | Schmidt | |
| 2003/0232112 A1* | 12/2003 | Whitmore | B65D 11/188 426/108 |
| 2005/0041894 A1 | 2/2005 | Hanson | |
| 2005/0161347 A1* | 7/2005 | Bohanan, Jr. | B65D 31/02 206/205 |
| 2006/0188177 A1 | 8/2006 | Dyer et al. | |
| 2007/0065048 A1 | 3/2007 | Eads et al. | |
| 2007/0189640 A1* | 8/2007 | Linton | B65D 31/12 383/38 |
| 2008/0089618 A1 | 4/2008 | Blythe | |
| 2008/0253696 A1 | 10/2008 | Haas et al. | |

OTHER PUBLICATIONS

Uline Jumbo Slider Zip Bags Model No. S-14518; accessed Jan. 22, 2015 at http://www.uline.com/...=S-14518Q2&gclid=CjwKEAiA3lKmBRDFx-P_rLyt6QUSJACqiAN8N_Hbs3InQauEJWzE_aJ5Hn_rLYnbz5GzE6t-6zVQPBoCwCbw_wcB&gclsrc=aw.ds[Jan. 22, 2015 3:20:32 PM].

* cited by examiner

CLOSURE BAG WITH REINFORCED HANDLES

BACKGROUND

The invention falls within the field of polymer ("plastic") bags that include handles, and particularly those bags in which the handles are formed by cutting an opening in the bag material near the top edge of the bag, and typically using a die cutting technique. Within this general bag design, there are circumstances in which the weight of the bag contents against the bag handles is disproportional; i.e., the walls of the bag are of sufficient strength (usually expressed as gauge or thickness) to hold the contents, but not sufficient to bear the entire weight at the die cut handles.

Conventional solutions to this problem exist but the most common are to use a heavier gauge of plastic for the entire bag; to add separate, stronger handles to the bag; or to reinforce the die cut handles, but not the entire bag.

Using a heavier gauge of plastic is less cost-effective whenever the contents portion of the bag doesn't require the same gauge as the handles.

Adding separate handles requires one or more extra manufacturing steps (as compared to die cut openings) and thus increases complexity and cost.

Reinforcing the bag at the handles is also helpful, and can be done with patches (usually rectangular) of extra plastic or some other material fixed to the inner faces of the bag at the position through which the die cut handles are opened. The patch structure has the cost advantage of minimizing the amount of extra material required, but also adds another manufacturing step.

Zipper closure bags are also well-established in the art and such bags can be formed with certain types of handles. In particular, a press-to-close zipper is typically added as a narrow ribbon in which the male and female profiles of the zipper are fastened together. Each respective profile is secured to one of the respective adjacent layers of the moving polymer film that is the precursor of the eventual finished bags.

Conventionally, the zipper must remain closed throughout the manufacture of the entire bag, because if a zipper is opened while the polymer sheet is in precursor form, the zipper may be difficult or impossible to re-close in an appropriate manner, and will thus prevent the manufacture of properly finished bags.

Adding reinforcing handle patches to the interior surface of the rolling plastic bag stock that already includes a press-to-close zipper is conventionally unknown. In particular, adding the patches requires that the layers of film be separated so that the patches can be first inserted and then heat welded to the film layers. Such a separation step is, however, incongruent with the requirement that the zipper profiles remain closed.

Thus, plastic bags that include both a press-to-close zipper and a reinforced die cut handle above the zipper are simply unavailable.

SUMMARY

In one aspect the invention is a polymer bag. In this aspect, the bag includes two facing sheets of polymer film, a top edge, a bottom edge, two side edges, and a polymer zipper attached to the inside of the face of sheets parallel to and between the top and bottom edges. A respective reinforcing patch is positioned on the inside surface of each of the two respective facing sheets and is positioned between the zipper and the top edge. An opening extends through each reinforcing patch and through each of the faces overlying each patch to define a handle for the bag.

In another aspect, the invention is a method of forming bag precursors and individual bags from a supply of polymer sheeting. The method includes the steps of folding a polymer sheet in half to form a bottom edge at the fold, two sheet faces, and a top edge opposite the fold. A pre-closed zipper is inserted into the top edge between the two folded sheets and the zipper is then fixed to the inside surface of each sheet at a position that defines and provides a header space between the zipper and the top edge of the sheet. This header space provides for the handles. The zipper is then opened and the sheets are separated at the zipper so that a patching device can access the interior of the bag at a position of sufficient with and depth between the polymer sheets to insert and then weld the reinforcing patches to the sheets. The zipper is maintained open along with the sheets and with the zipper in alignment while applying the reinforcing patches to the interior of each sheet at the opening. Thereafter the aligned zipper portions are closed.

To complete a bag structure, the handle openings are cut through the reinforcing patches and the sheets, after which the sheets are cut and sealed perpendicularly to the top and bottom edges to form individual bags with both zippers and reinforced handles.

In yet another aspect, the invention is a bag precursor structure that includes a sheet of polymer film folded to define two facing sheets. A top edge is formed by the unfolded edges placed adjacent one another, and the bottom edge is formed by the fold. A zipper is attached to the inside of the facing sheets parallel to and between the top and bottom edges. The respective reinforcing patches are positioned on the inside surface of each of the two respective facing sheets and between the zipper and the top edge.

The foregoing and other objects and advantages of the invention and the manner in which the same are accomplished will become clearer based on the followed detailed description taken in conjunction with the accompanying drawings.

DETAILED DESCRIPTION

Those of skill in the art will recognize that many of the steps in handling polymer film sheeting and creating bag precursors and bags from such sheeting are otherwise conventional and well understood in this art. It will be further understood that the drawings are at least partially schematic in nature, and for purposes of clarity do not attempt to illustrate (or name) every mechanical item included in such otherwise conventional equipment.

Figure 1:
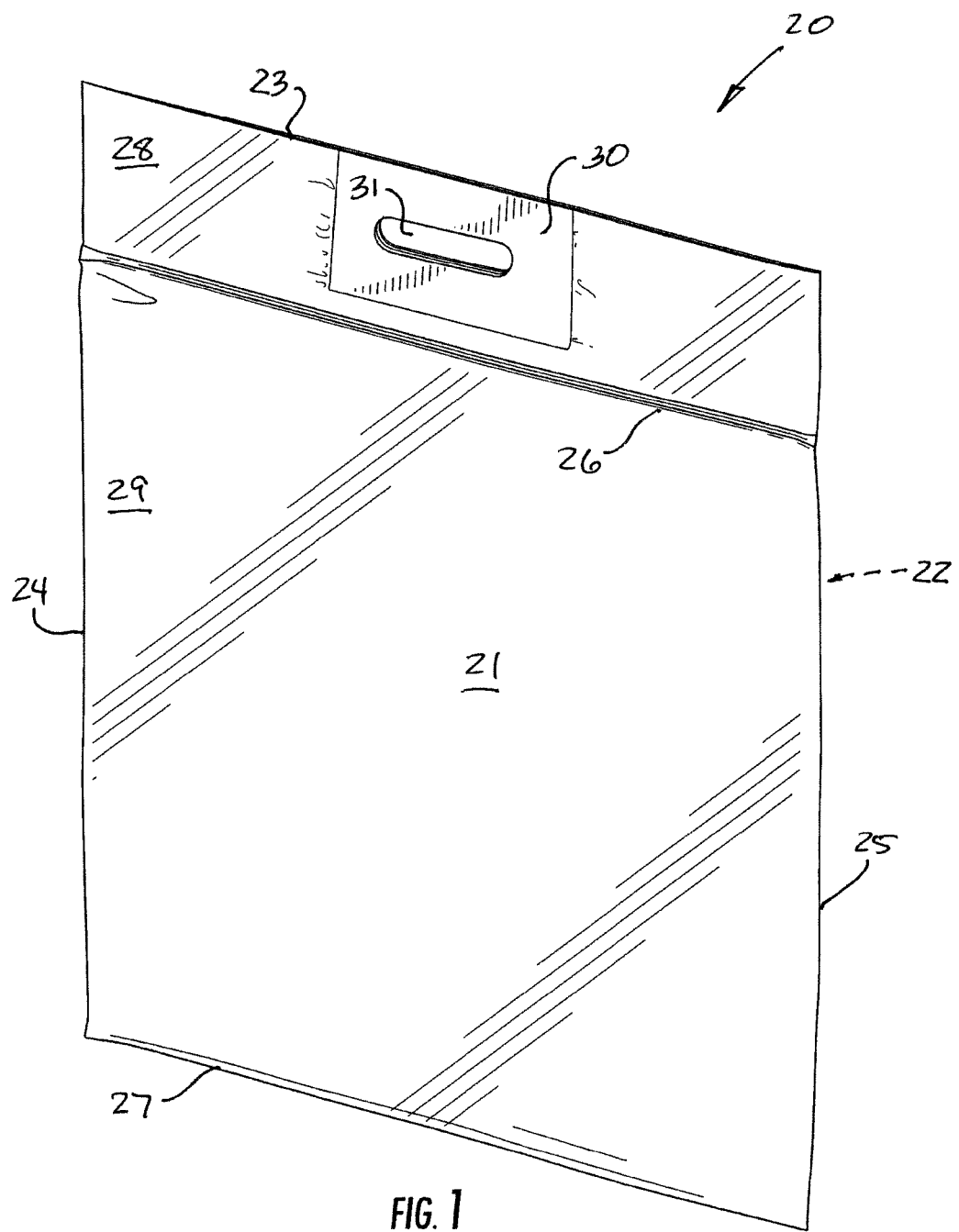
FIG. 1 is a perspective view of a finished bag according to the invention.

FIG. 1 is a perspective view of a bag according to the invention broadly designated at 20. The bag is formed of two facing sheets 21 and 22 of polymer film, and as illustrated in FIG. 1, the first sheet 21 forms the front of the illustrated bag and the second sheet 22 forms the back. The top edge of the bag 23 is formed where the two sheets 21 and 22 meet. The bag includes two respective side edges 24 and 25 and as set forth herein these are typically formed as heat seals that both form the edge and separate a bag precursor into an individual bag.

A polymeric zipper 26 is attached to the inside of the facing sheets 24 and 25 and is positioned parallel to and between the top edge 23 and the bottom edge 27. The illustrated zipper 26 is of the press-to-close variety that is typically formed from respective male and female profiles that snap or wedge together in an otherwise well-understood fashion. By way of comparison, "slide-to-close" zippers use a "slider" that is pulled across the bag to close the male and female profiles.

A respective reinforcing patch 30 is positioned on the inside surface of each of the two respective facing sheets 21, 22 and is located between the zipper 26 and the top edge 23 of the bag 20.

An opening 31 extends through each reinforcing patch 30 and through each of the faces 21, 22 that overlie each of the patches 30 to define the handle for the bag 20.

The bag can be formed from any appropriate polymer, with thermoplastic polymers such as polyethylene being appropriate. Other relevant polymers include polypropylene, polyester, polyurethane, and polyvinyl acetate. In some cases the polymer is chosen for secondary characteristics such as being biodegradable, antistatic, or resistant to (or in some cases blocking the transmission of) ultraviolet light.

These polymers and their features are, of course, exemplary rather than limiting of the invention. As those in the art are well-aware, such polymers can be customized in various fashions, and such versions (for example the several density characterizations of polyethylene) can be selected and used in the invention without undue experimentation.

In the illustrated embodiment, the bottom edge 27 is folded in accordance with the described method. If desired, the bottom of the bag can carry an extra set of folds to form a gusset in the finished bag, a step that is well understood in the art and not otherwise illustrated herein.

Both the zipper 26 and the reinforcing patches 30 can be formed from a similar selection of polymers, and in exemplary embodiments, these items are thermoplastic. In some cases the bag sheet material, the zipper material, and the patch material are all the same polymer.

FIGS. 2-6, 9, and 10 illustrate method aspects of the invention.

Figure 2:
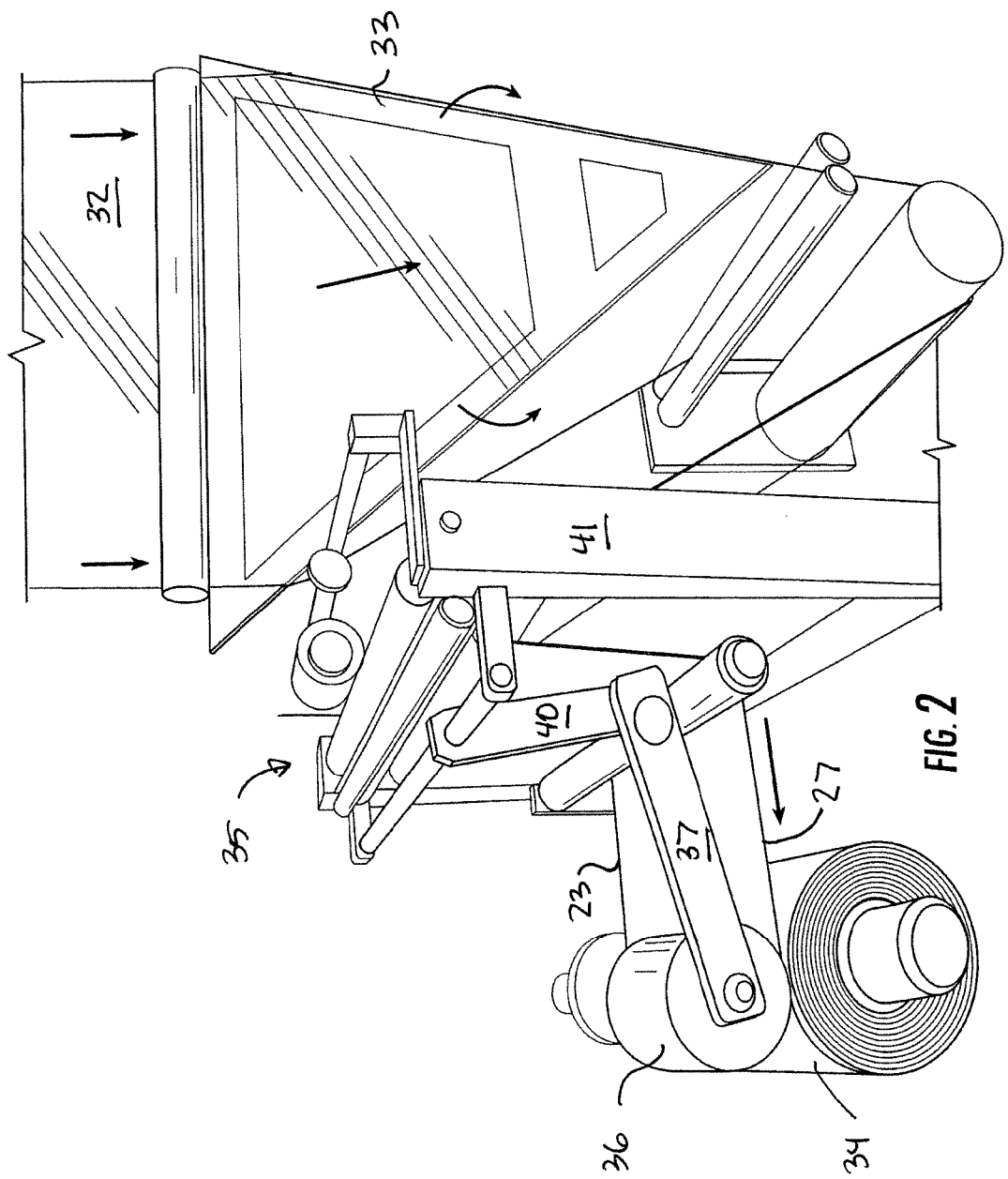
FIG. 2 is a partially schematic view of a folding triangle for polymer sheeting useful in the method of the invention.

FIG. 2 illustrates portions (i.e., FIG. 2 is partially schematic) of a triangle type folding machine that is useful in the claimed invention. The first step in the method is the step of folding a polymer sheet in half to form the bottom edge 27 at the fold. Accordingly, FIG. 2 illustrates an unfolded sheet 32 of polymer material. When the single sheet 32 is directed over the folding triangle 33 and pulled towards the stock roll 34, the triangle 33 orients the sheet into a fold. The nature and operation of a triangle folding machine is well understood in the art and need not be described in great detail. As partially illustrated in FIG. 2, the folded bottom edge 27 and the unsealed top edge 23 progress from the folding triangle 33 over a plurality of rollers (together broadly designated at 35), and beneath a stabilizing drum 36 which can move on a pair of arms 37 and 40. The relevant rollers and other mechanical parts are maintained on a frame 41.

Furthermore, although FIG. 2 illustrates the folded polymer sheet material being collected on the stock roll 34, it will be understood that in an assembly line fashion, the folded sheets could proceed directly to the next step in the method and without being collected on a roll.

Thus, after the steps illustrated in FIG. 2 have been carried out, the polymer sheet 32 has been folded in half to create the bottom edge 27, two sheet faces 21 and 22, and the top edge 23 opposite the folded bottom edge 27. As set forth with respect to the structural aspects, a gusset can be folded in or near the fold 27 if desired, but is not illustrated here.

Figure 3:
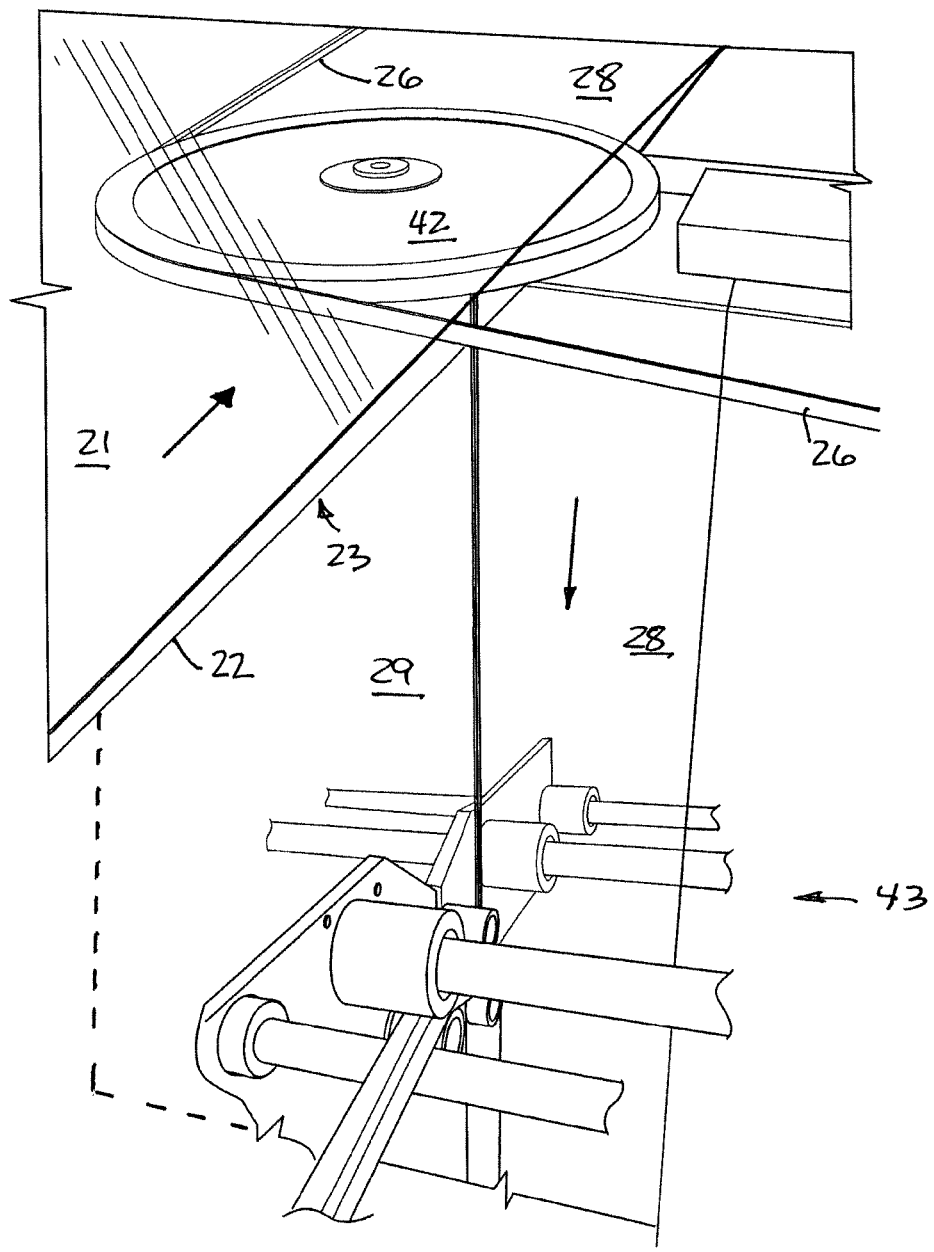
FIG. 3 is a partially schematic perspective view of a press-to-close zipper strip being applied to plastic sheeting.

FIG. 3 illustrates part of the next step, that of inserting the pre-closed zipper 26 into the top edge 23 of the first and second sheets 21, 22 that together define the moving folded bag precursor. As illustrated in FIG. 3, the zipper 26 is directed in a clockwise direction around a rotating disk 42 that is positioned so that the zipper 26 is in turn oriented and spaced a desired distance from the top edge 23 to define the header portion 28 of the bag precursor and eventually of the bag. The arrows in FIG. 3 indicate the direction of travel and illustrate the bag precursor material moving from lower left towards upper right, then turning 90° over a roller (not shown) and then proceeding downwardly to a next step and driven by a plurality of guiding and driving shafts and rolls which are otherwise conventional and which are broadly designated together at 43.

The addition of the strip 26 defines both the header portion 28 and the bag portion 29 of the precursor and then of the bag itself.

Stated directly, FIG. 3 illustrates the step of inserting the pre-closed zipper 26 38.1: (with the male and female profiles having been pre-closed) into the top edge 23 between the folded sheets 21, 22. The zipper 26 is then fixed to the inside surfaces of each of the sheets 21, 22 and in a position that defines the header space 28 between the zipper 26 and the top edge 23 of the sheet. The header space 28 will in turn become the top (header) portion of the bag to provide space for the handles.

The zipper 26 typically consists of extruded, pre-closed, male and female profiles that are wound on spools for use in the bag making steps and machinery. The zipper 26 is typically heat sealed in place, particularly when the bag material and the zipper material are formed of thermoplastic polymers. This can be carried out in any appropriate manner. In one conventional technique (not shown), the pre-closed profiles of the zipper 26 are advanced between two fabric belts (e.g., Teflon) that in turn move between two stationary heat sealing bars. As well understood in the art, the amount of heat applied should be sufficient to fashion the zipper 26 to the sheets 21, 22, but without melting the male and female portions of the zipper into one another.

Figure 4:
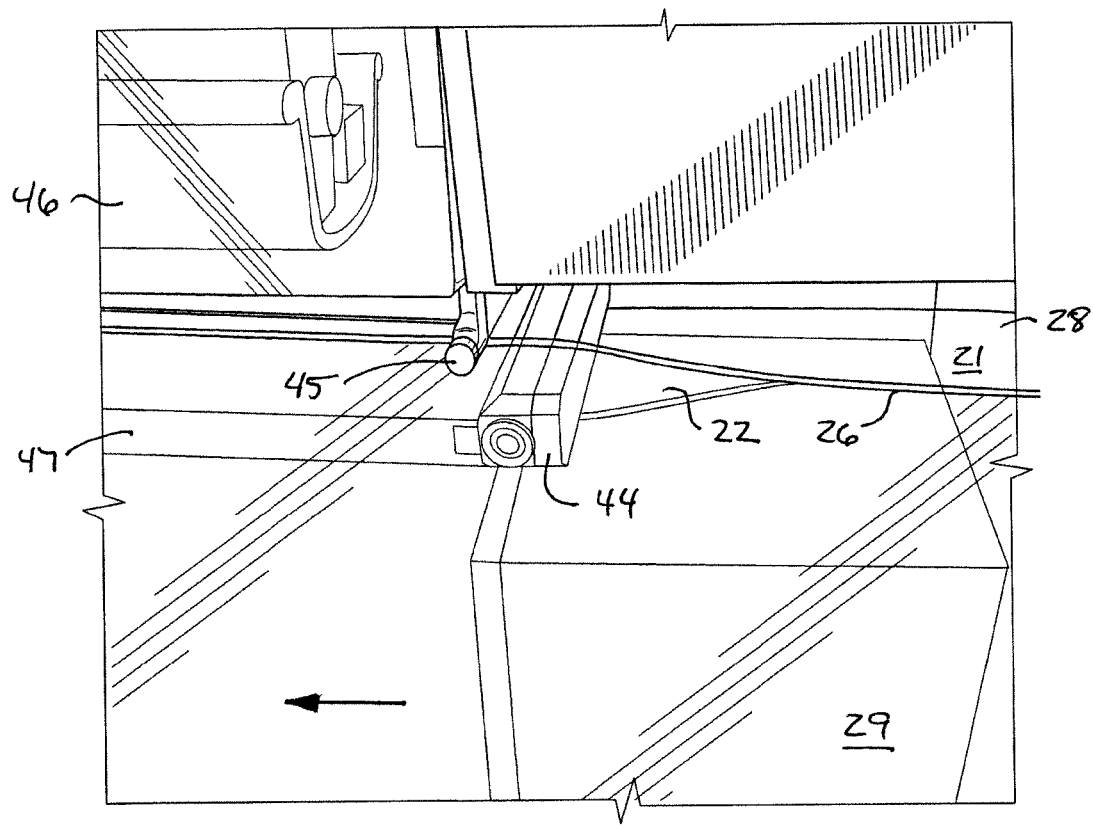
FIG. 4 is a perspective view of the zipper-opening step of the invention.

FIG. 4 illustrates the next step in the method in which the profiles of the zipper 26 are opened and the sheets 21 and 22 are separated at the zipper 26. This step has conventionally been avoided because of the difficulty (in the context of modern bag making machinery) of re-closing the zipper profiles after they have been opened. FIG. 4 accordingly illustrates the first or top sheet 21, the second or bottom sheet 22 and the zipper 26. As in the other drawings, the header portion is illustrated at 28; i.e., in the orientation of FIG. 4 the bag portion 29 of the bag precursor is at the bottom, and the header portion 28 is above the zipper 26. In FIG. 4, the movement of the bag precursor is from right to left as indicated by the directional arrow.

With respect to the method step, FIG. 4 also illustrates that the sheets 21 and 22 are separated, and the zipper 26 is opened, as they pass over an opening arm 44 and are directed by at least one (and potentially several) guides 45.

FIG. 4 also illustrates other conventional elements including a portion 46 of a patch sealing device and a corresponding sealing platform or anvil 47.

The step of opening the zipper 26 and separating the sheets 21, 22 allows the patching device (FIGS. 5A and 5B; which is otherwise conventional), to access the interior of the bag precursor at a position (i.e., sufficient width between and depth into the polymer sheets) to place and secure the eventual reinforcing patches.

Figure 5A:
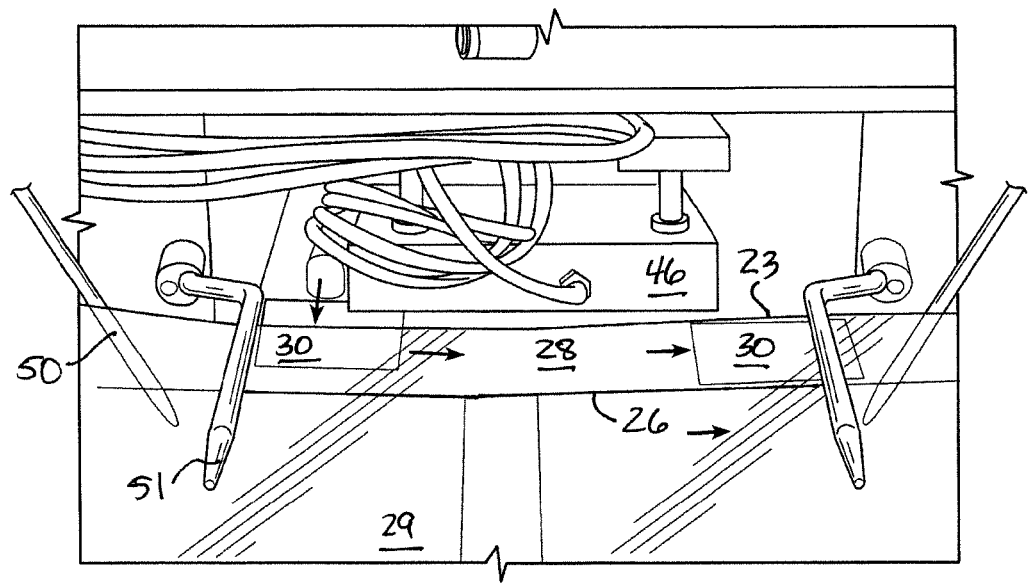
FIGS. 5A and 5B illustrate the application of a reinforcing patch to moving sheets of polymer film.
Figure 5B:
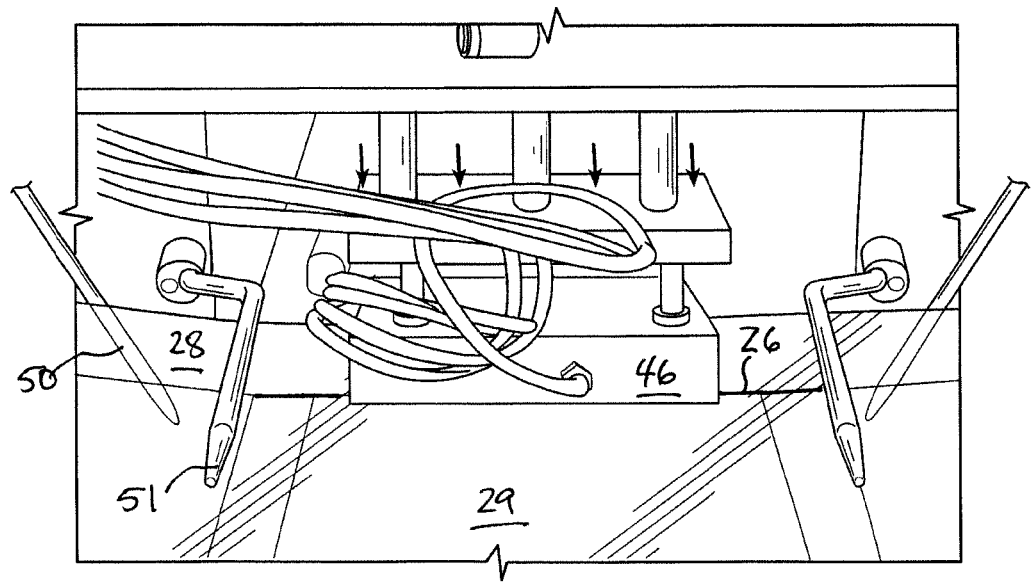

In that regard, FIGS. 5A and 5B illustrate the step of maintaining the open zipper 26 portions and sheets 21, 22 in alignment while applying the reinforcing patches to the interior of each sheet at the opening. FIGS. 5A and 5B again illustrate the patch heat sealer 46. In this embodiment, the patches 30 are directed between the sheets 21 and 22 initially perpendicularly, and as explained previously are positioned between the top edge 23 and the zipper 26. In the orientation of FIGS. 5A and 5B, the bag precursor material (i.e., the sheets 21 and 22) is proceeding from left to right. A bag opening pin 50 keeps the sheets 21 and 22 separated while the patches 30 are being inserted by the patch heat sealer 46. A pair of guide pins 51 help maintain the moving film oriented properly with respect to the patch heat sealer 46.

FIGS. 5A and 5B are essentially identical, with the only difference being that the patch heat sealer 46 is in an open position in FIG. 5A and in a closed (sealing) position in FIG. 5B. In FIG. 5B, the relevant patch 30 is being sealed underneath the patch heat sealer 46, and thus no other patches are being inserted or are visible at the particular illustrated moment.

In an exemplary embodiment, the patches 30 have a width that is less than (smaller) than the header space defined by the zipper 26 and the top edge 23. Larger patches could, of course, be inserted, but would need to be trimmed or otherwise accounted for both in the machinery and the method.

Figure 6:
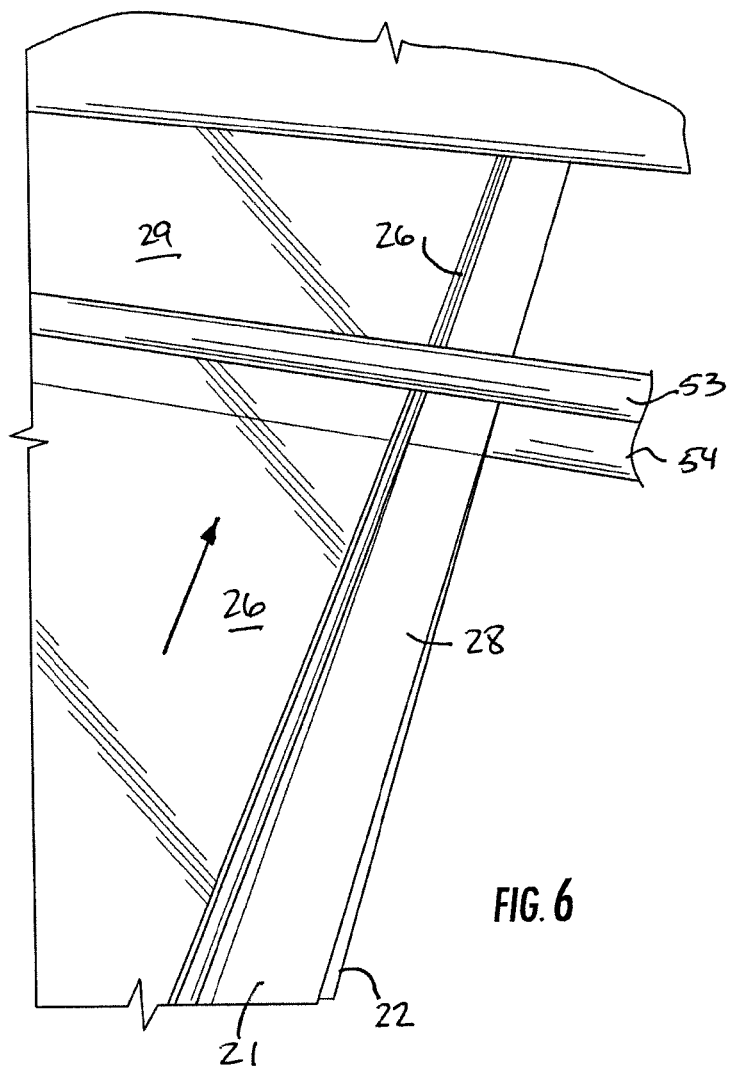
FIG. 6 is a perspective view of the aligned zipper profiles being re-closed at pinch rollers.
Figure 7:
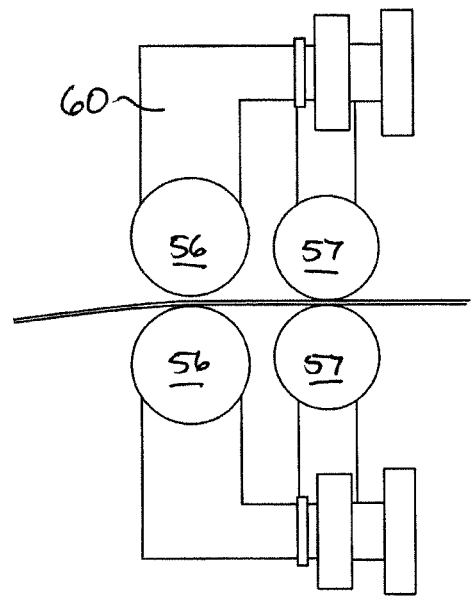
FIG. 7 is a schematic side elevation overview of an alignment and reclosing device according to the invention.
Figure 8:
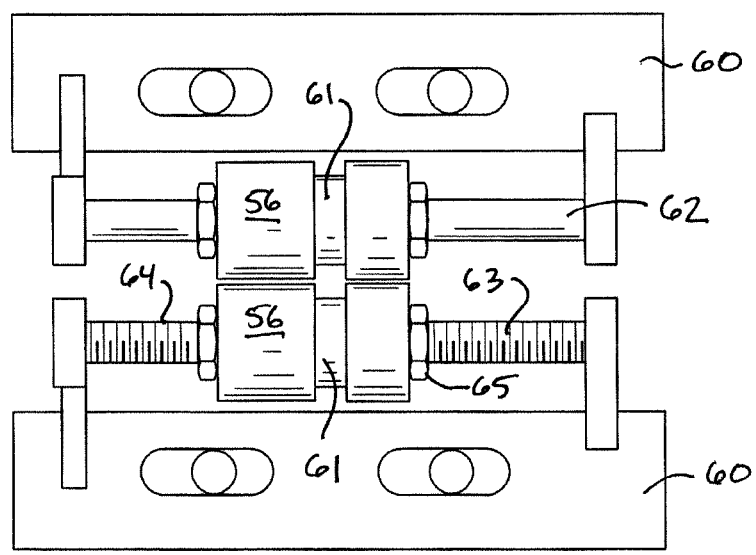
FIG. 8 is another elevational view of the structure of FIG. 7.

FIGS. 6, 7 and 8 help illustrate the next step in the method, that of reclosing the aligned profiles of the zipper portion 26 after the reinforcing patches 30 have been added and sealed to the interior surfaces of the sheets 21, 22. This step of the invention stands in contrast to conventional methods, because the step of opening a zipper has been conventionally avoided, and in turn the step of closing the zipper has likewise been avoided.

FIG. 6 illustrates that if the male and female profiles of the zipper 26 are carefully maintained in alignment during the step of adding the reinforcing patches 30, the zipper 26 can be closed using a set of pinch rollers 53, 54. FIG. 6 thus illustrates the sheets 21, 22, the zipper 26 as progressively open and then closed, the bag portion 29 and the header portion 29.

FIGS. 7 and 8 are respective elevational views of an alternative embodiment for aligning and reclosing the zipper 26. FIG. 7 shows a pair of guide rolls 56 and a pair of pinch rolls 57 mounted on a flame 60. As in earlier embodiments, the direction of travel is indicated by the arrow, and FIG. 7 illustrates the film moving from left to right.

FIG. 8 provides more detail and shows that the guide rolls 56 include a respective guide channel 61 for aligning the zipper profiles just before they reach the pinch rolls 57. The guide rolls are on respective shafts 62, 63, one of which is illustrated with threading 64 to indicate the possibility of adjusting the position of the guide rolls 56 on the shafts. The position of the rolls 56 can be secured using the nuts 65.

Figure 9:
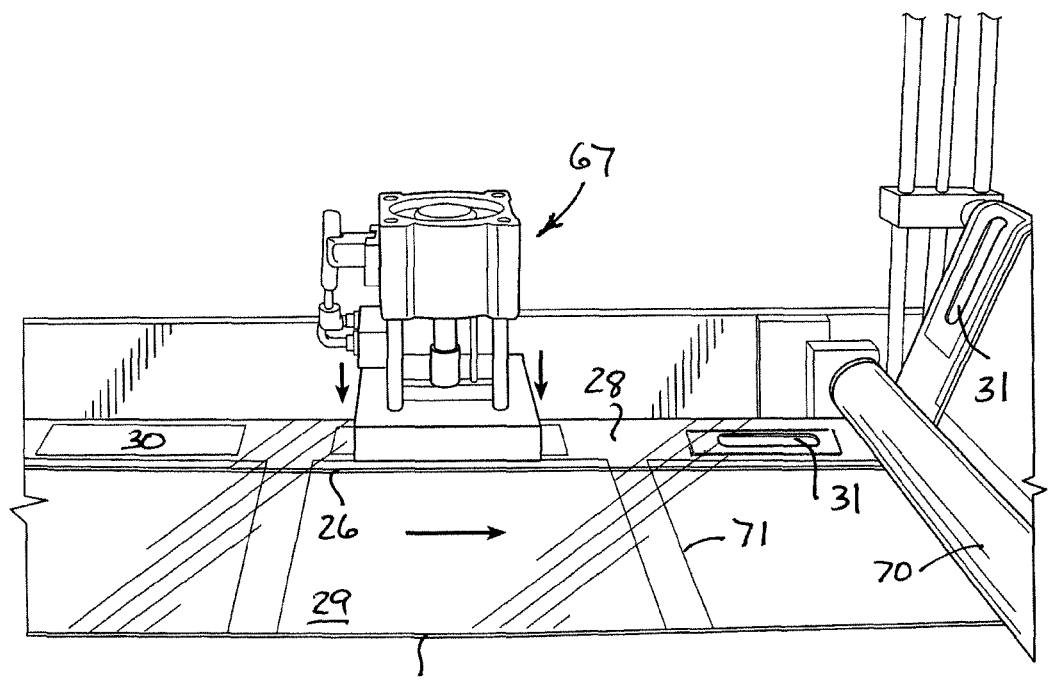
FIG. 9 illustrates a die cutting operation for bags precursors according to the invention.

FIG. 9 illustrates the last step in forming a bag precursor and the penultimate step in forming a bag; namely forming an opening 31 in the precursor at the patch 30 positions. Once the profiles of the zipper 26 have been closed in accordance with the invention, the step of forming the opening 31 is otherwise conventional and in exemplary embodiments is easily carried out with a die cutter illustrated at 67. The use and operation of the die cutter is well understood in this art and will not be otherwise described in detail herein. As illustrated by the arrow, in the orientation of FIG. 9 the bag precursors are moving from left to right, and for various purposes are directed over another roller 70.

FIG. 9 also uses the relatively large squares 71 to illustrate that in many commercial embodiments, the bag material can be printed before any of the bag making steps are carried out, or between any one or more of the indicated steps (provided, of course, that any printing step avoids interfering with the bag making steps or the bag making characteristics of the polymer sheet). Printing the film prior to making the bag tends to be more common.

At this point, the bag precursors can be collected on a stock roll for later separation, or can be separated to form the final bag. As a precursor structure, the invention includes the sheet of polymer film 32 folded to defined two facing sheets 21, 22; the top edge 23 formed by the unfolded edges of the sheets 21, 22; and the bottom edge 27 formed by the fold. The zipper 26 is attached to the inside of the facing sheets 21, 22 parallel to and between the top and bottom edges 23, 27. The reinforcing patches 30 are positioned on the inside surface of each of the facing sheets 21, 22 at a position between the zipper 26 and the top edge 23.

Figure 10:
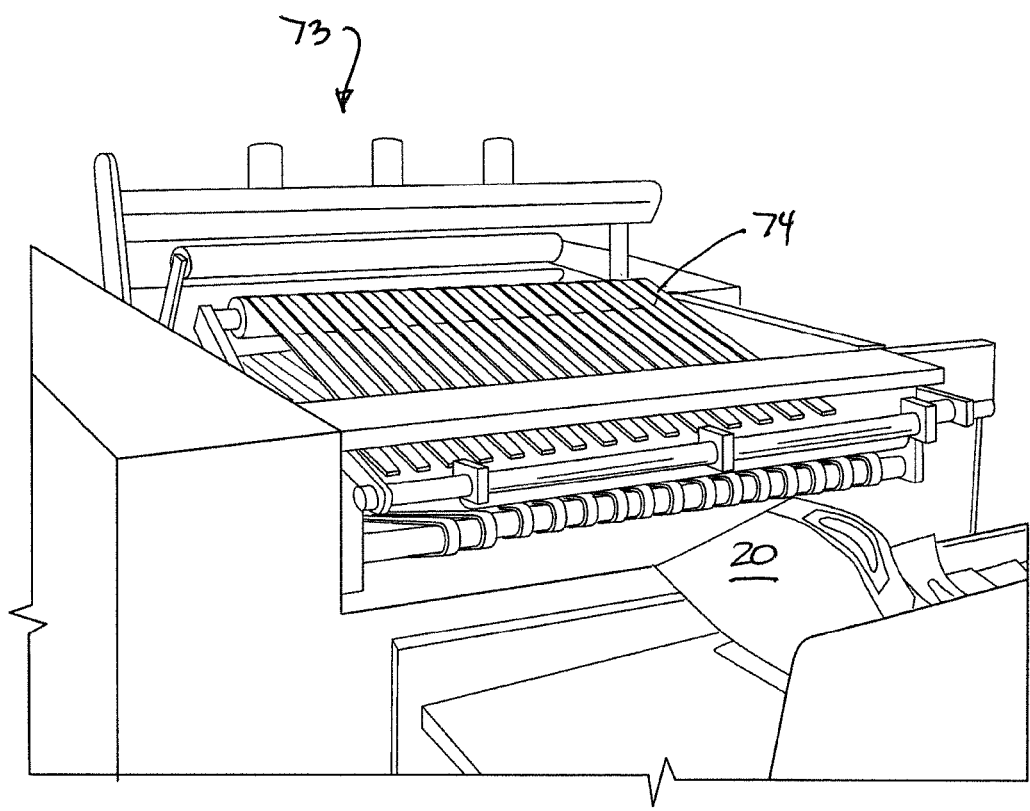
FIG. 10 illustrates a belted delivery machine for finished bags.

FIG. 10 illustrates a conveyor device broadly designated at 73 along with its belts 74 that delivers the final bag for packing, transport, delivery, and use.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A polymer bag comprising:
two facing sheets of thermoplastic polymer film that define a folded bottom edge, two facing inside surfaces and a top edge opposite said bottom edge;
two heat sealed side edges perpendicular to said top and bottom edges;
a polymeric zipper attached to the inside of said facing sheets parallel to and between said top and bottom edges;
a header space defined by said heat sealed side edges, said top edge and said polymeric zipper;
a respective thermoplastic reinforcing patch heat sealed on the inside facing surface of each of said two respective facing sheets and between said zipper and said top edge, said thermoplastic reinforcing patches having a width that is less than the width of said header space defined by said polymeric zipper, said side edges, and said top edge; and
an opening through each reinforcing patch and through each said facing sheet overlying each said reinforcing patch to define a bag handle.

2. A polymer bag according to claim 1 wherein said thermoplastic polymer film is selected from the group consisting of polyethylene, polypropylene, polyester and polyurethane.

3. A polymer bag according to claim 1 wherein said top edge is formed by the respective unsealed edges of said two facing sheets.

4. A polymer bag according to claim 1 wherein said reinforcing patches are selected from the group consisting of polyethylene, polypropylene, polyester and polyurethane.

5. A polymer bag according to claim 1 wherein said reinforcing patches are the same polymer as said two facing sheets.

6. A polymer bag according to claim 1 wherein said polymeric zipper is heat sealed to said facing sheets.

7. A method according to claim 1 wherein said zipper comprises a press to close zipper formed of preclosed male and female profile portions.

8. A bag precursor structure comprising:
 a sheet of thermoplastic polymer film folded to define a folded bottom edge, two facing sheets, and a top edge formed by the unfolded edges of said facing sheets,
 a polymeric zipper heat sealed attached to the inside facing surface of each of said facing sheets, and parallel to and between said top and bottom edges;
 a header space defined by said top edges and said polymeric zipper; and
 a respective thermoplastic reinforcing patch positioned on the inside surface of each of said two respective facing sheets and between said zipper and said top edge, each said patch having a width that is less than the width of said header space defined by said polymeric zipper and said top edge.

9. A polymer bag according to claim 8 wherein:
 said thermoplastic polymer film is selected from the group consisting of polyethylene, polypropylene, polyester and polyurethane; and
 said thermoplastic reinforcing patches are selected from the group consisting of polyethylene, polypropylene, polyester and polyurethane.

10. A polymer bag according to claim 8 wherein said thermoplastic reinforcing patches are the same polymer as said two facing sheets.

* * * * *